(12) United States Patent
Koo et al.

(10) Patent No.: US 11,305,648 B2
(45) Date of Patent: Apr. 19, 2022

(54) KICKDOWN SWITCH FOR ACCELERATION PEDAL AND METHOD OF CONTROLLING MISOPERATION OF ACCELERATION PEDAL USING THE SAME

(71) Applicants: HYUNDAI MOTOR COMPANY, Seoul (KR); KIA MOTORS CORPORATION, Seoul (KR); Dong Hee Industrial Co., Ltd., Ulsan (KR)

(72) Inventors: Ja Yong Koo, Bucheon-si (KR); Jee Hyuck Choi, Hwaseong-si (KR); Chang Hyun Lee, Seoul (KR); Eun Sik Kim, Gwangmyeong-si (KR); Eul Ho Son, Pyeongtaek-si (KR); Wi Sang Park, Pyeongtaek-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 428 days.

(21) Appl. No.: 16/561,402

(22) Filed: Sep. 5, 2019

(65) Prior Publication Data
US 2020/0317051 A1 Oct. 8, 2020

(30) Foreign Application Priority Data
Apr. 8, 2019 (KR) .................. 10-2019-0040805

(51) Int. Cl.
| | |
|---|---|
| *B60R 22/00* | (2006.01) |
| *B60K 26/02* | (2006.01) |
| *B60W 30/09* | (2012.01) |
| *G05G 1/44* | (2008.04) |
| *B60Q 9/00* | (2006.01) |

(Continued)

(52) U.S. Cl.
CPC ............ *B60K 26/021* (2013.01); *B60Q 9/008* (2013.01); *B60W 10/04* (2013.01); *B60W 10/10* (2013.01); *B60W 10/18* (2013.01); *B60W 30/09* (2013.01); *F16H 59/20* (2013.01); *G05G 1/38* (2013.01); *G05G 1/44* (2013.01)

(58) Field of Classification Search
CPC ..... B60K 26/021; B60Q 9/008; B60W 10/04; B60W 10/10; B60W 10/18; B60W 30/09; F16H 59/20; G05G 1/38; G05G 1/44
See application file for complete search history.

(56) References Cited

U.S. PATENT DOCUMENTS

| | | | |
|---|---|---|---|
| 11,021,058 B1 * | 6/2021 | Kim | ..................... G05G 5/03 |
| 2018/0253120 A1 * | 9/2018 | Kim | ..................... G05G 5/05 |

FOREIGN PATENT DOCUMENTS

| | | |
|---|---|---|
| JP | 2002-046497 A | 2/2002 |
| JP | 2005-090502 A | 4/2005 |

(Continued)

*Primary Examiner* — Adam M Alharbi
(74) *Attorney, Agent, or Firm* — Morgan, Lewis & Bockius LLP

(57) ABSTRACT

A kickdown switch for an accelerator pedal informs a driver of a misoperation state by using a kickdown switch provided in the accelerator pedal when the driver misoperates the accelerator pedal rather than operating a brake pedal while braking is required. Accordingly, the driver can definitely recognize the misoperation state of the accelerator pedal and rapidly stop misoperation of the accelerator pedal and sudden acceleration of the vehicle, whereby occurrence of accidents can be prevented.

13 Claims, 10 Drawing Sheets

(51) Int. Cl.
*F16H 59/20* (2006.01)
*B60W 10/04* (2006.01)
*B60W 10/18* (2012.01)
*B60W 10/10* (2012.01)
*G05G 1/38* (2008.04)

(56) References Cited

FOREIGN PATENT DOCUMENTS

| | | |
|---|---|---|
| JP | 2013-043625 A | 3/2013 |
| JP | 2013-224117 A | 10/2013 |
| JP | 2013-233893 A | 11/2013 |
| KR | 10-0360333 B1 | 3/2004 |
| KR | 10-0877200 B1 | 1/2009 |
| WO | 1995/031349 A1 | 11/1995 |

\* cited by examiner

[Fig. 1]
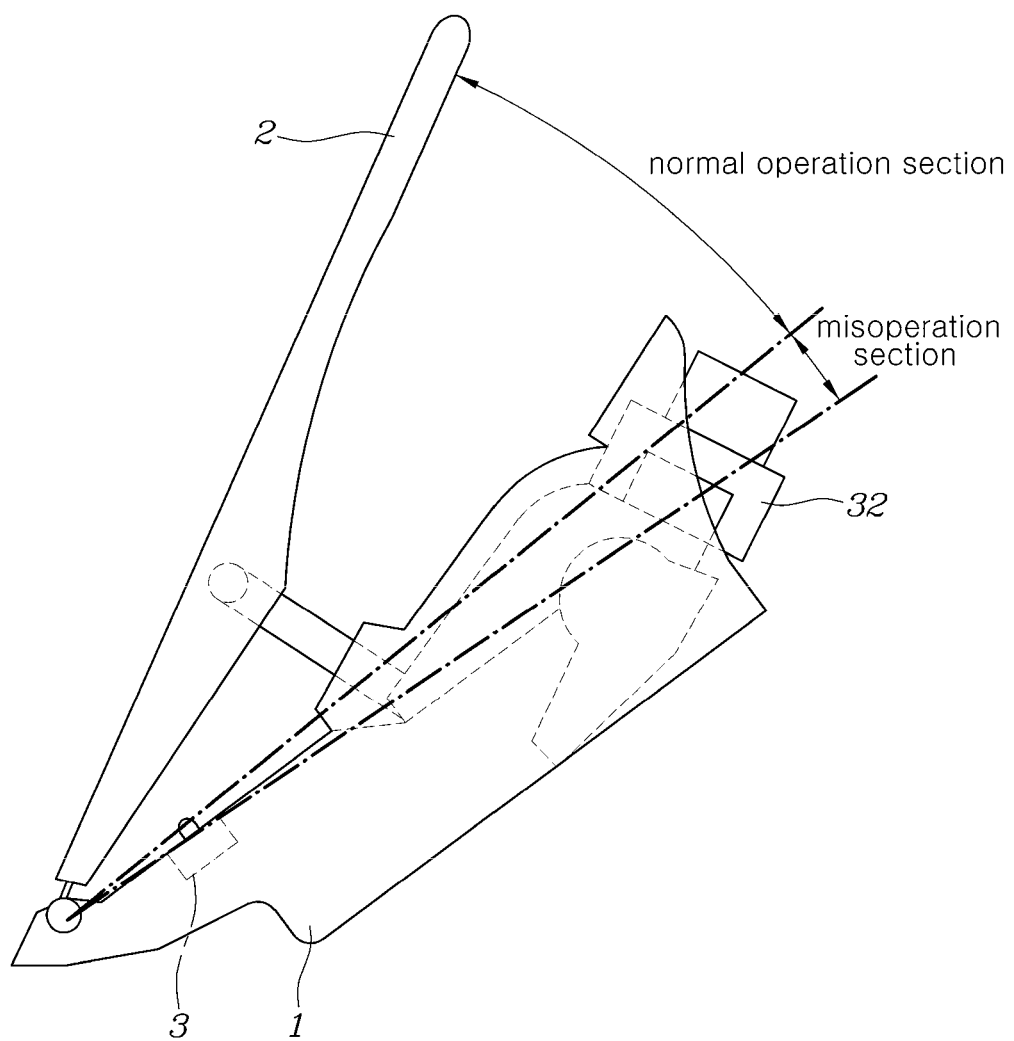

[Fig. 2]
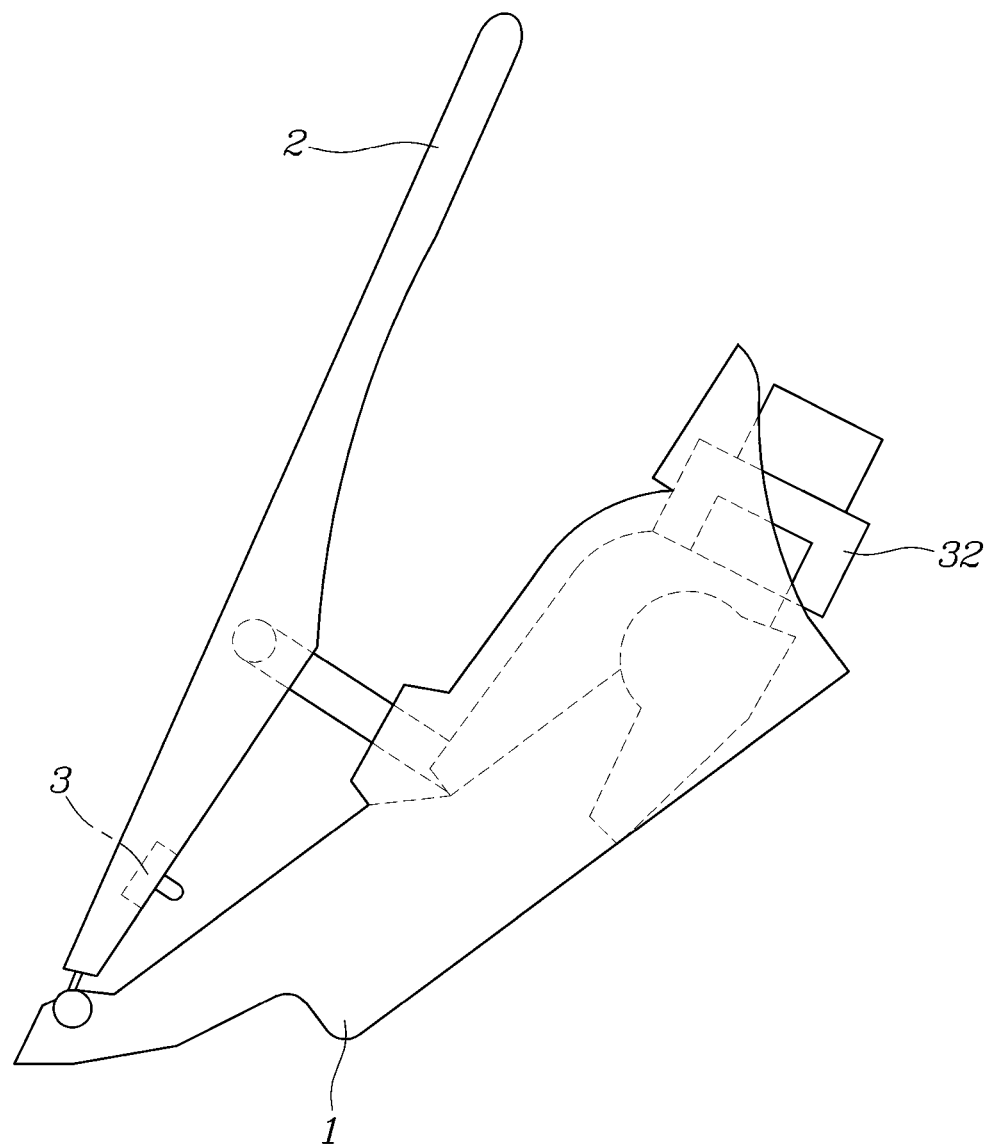

[Fig. 3]
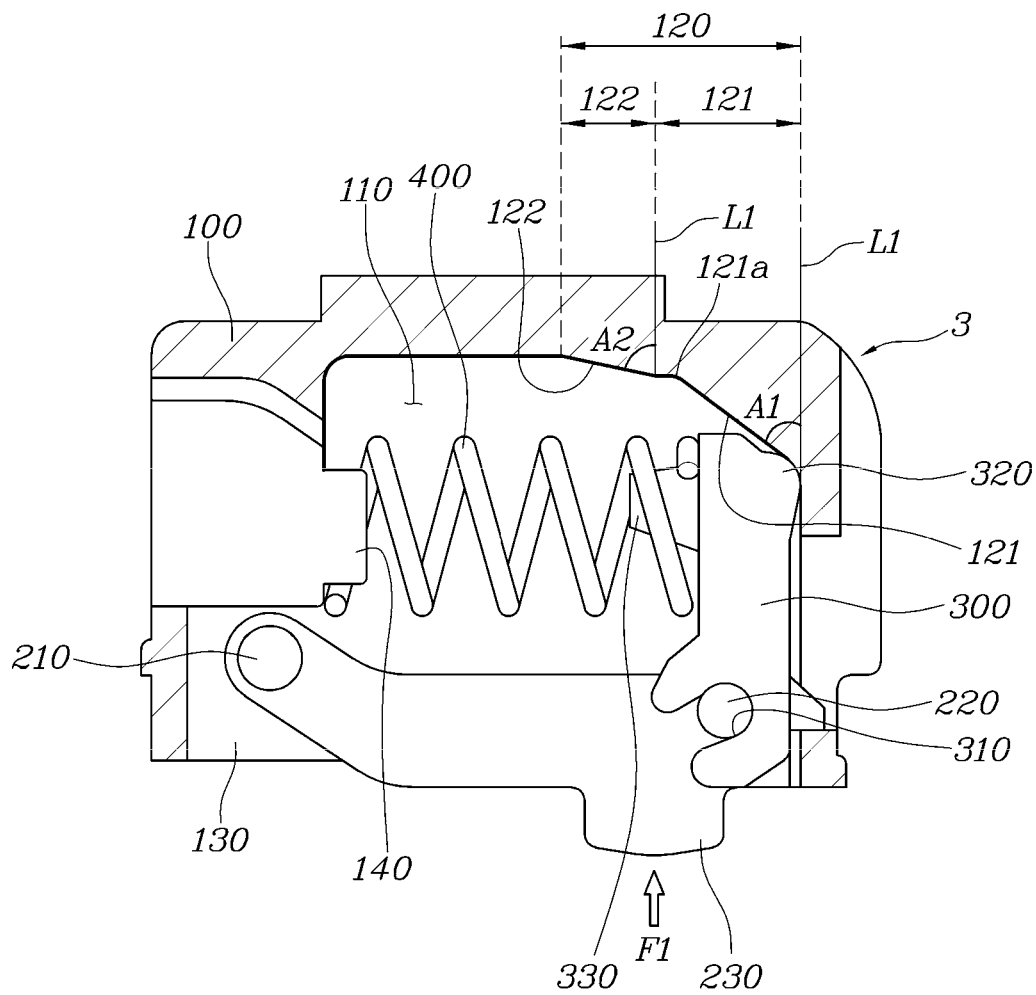

[Fig. 4]
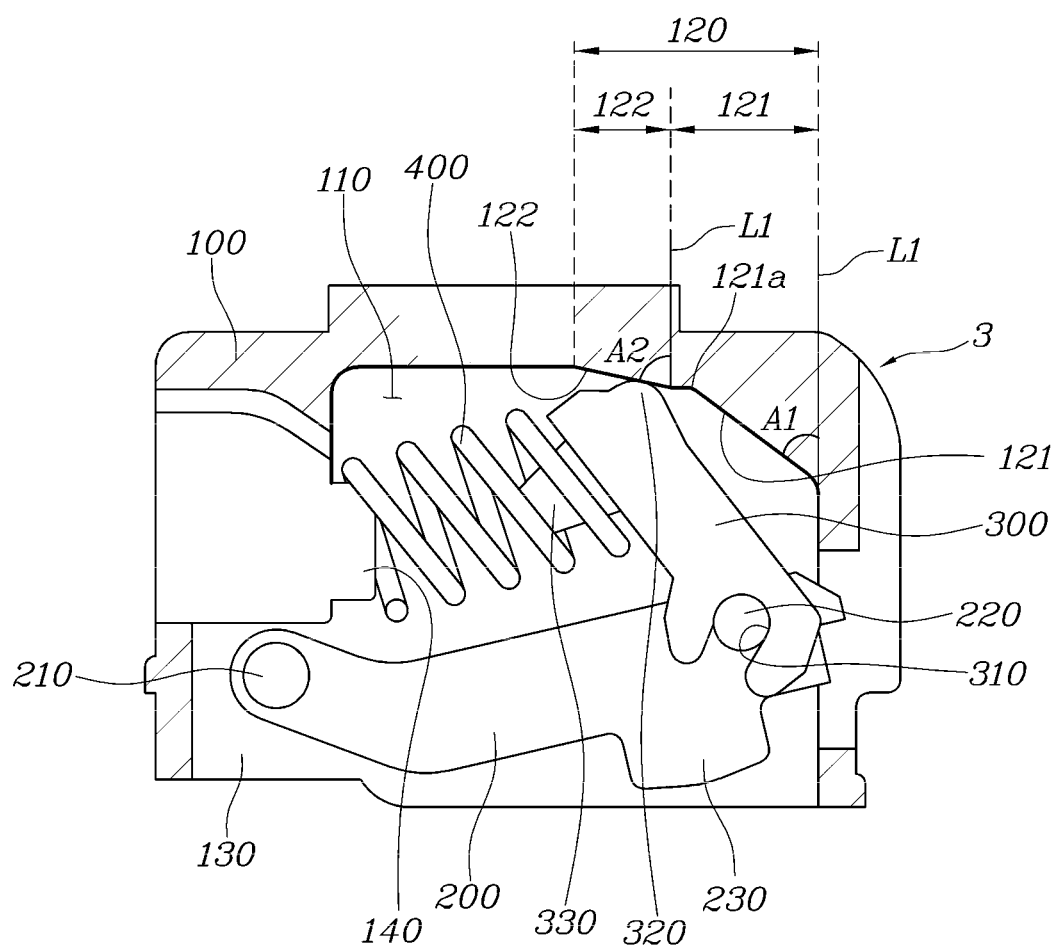

[Fig. 5]
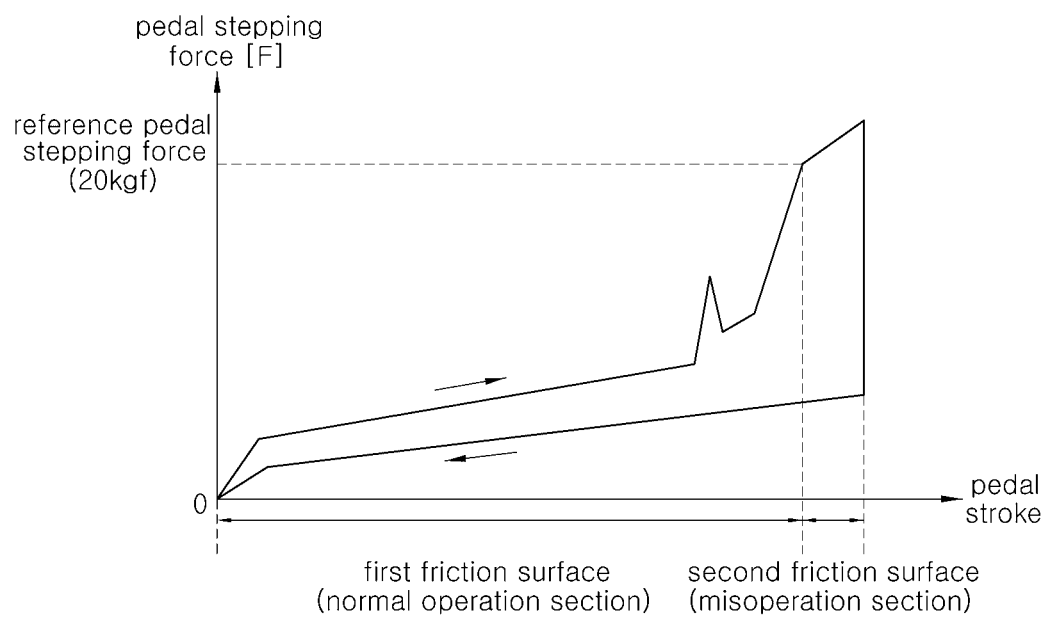

[Fig. 6]
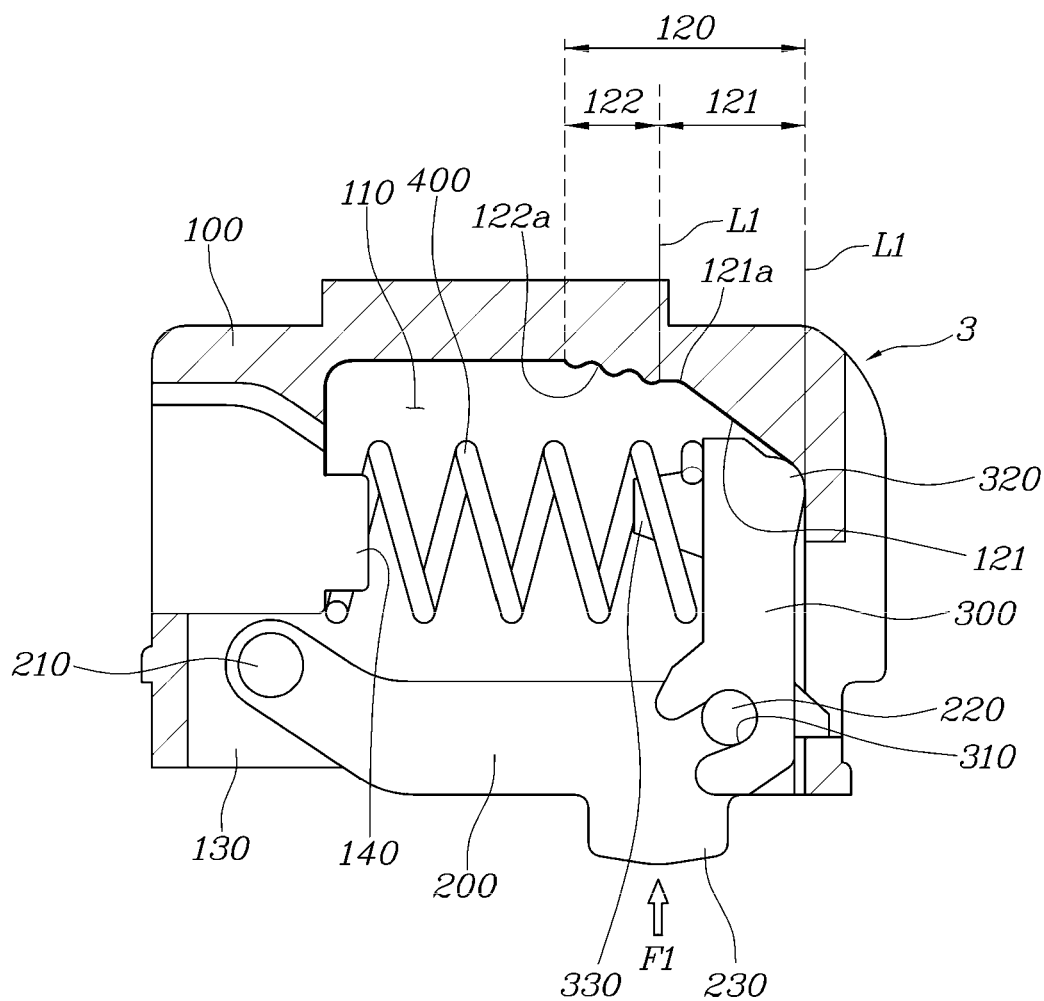

[Fig. 7]
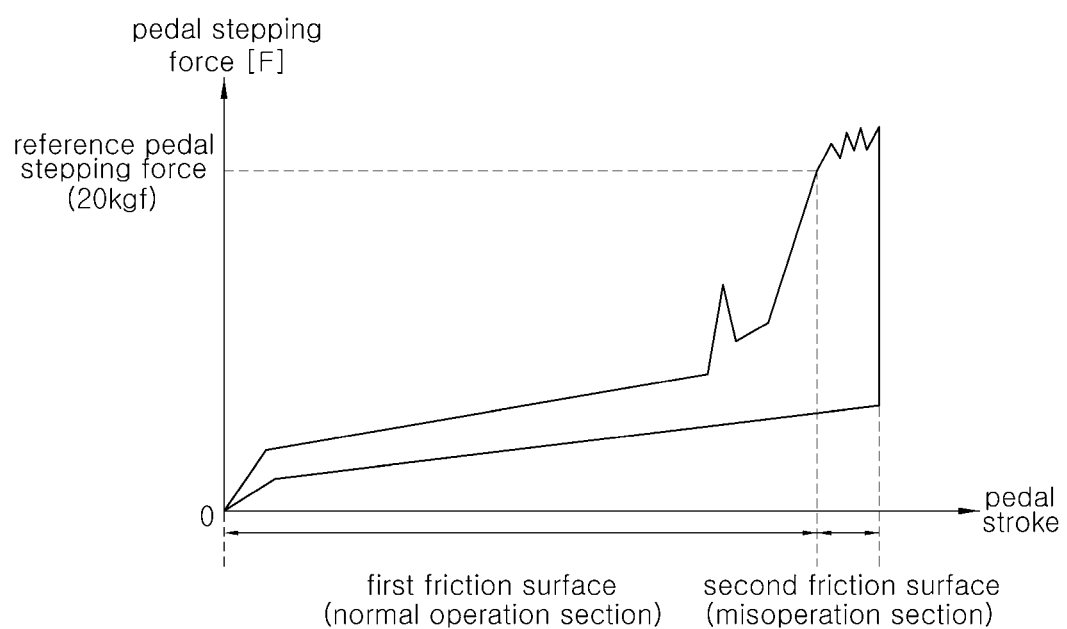

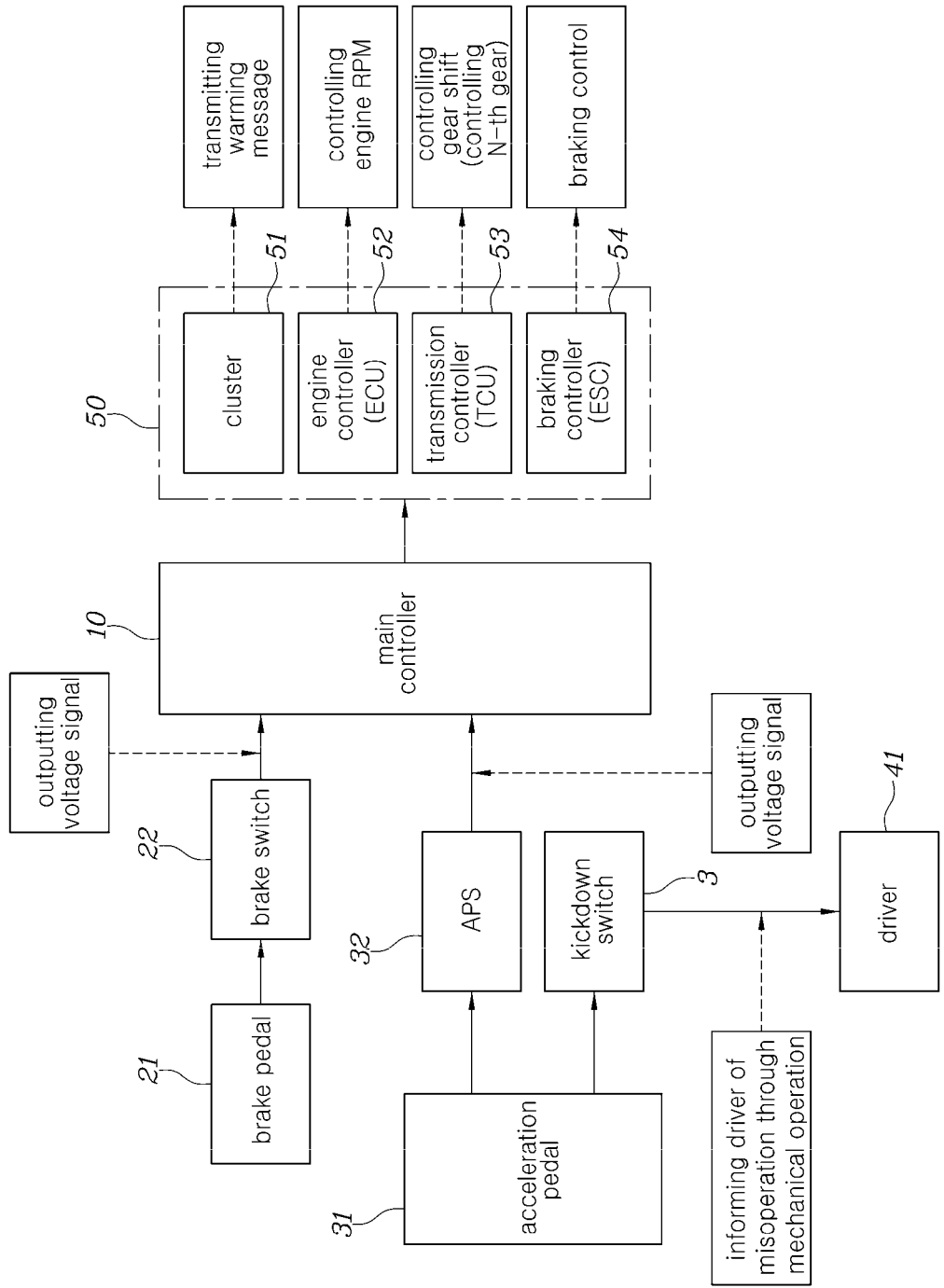
[Fig. 8]

[Fig. 9]
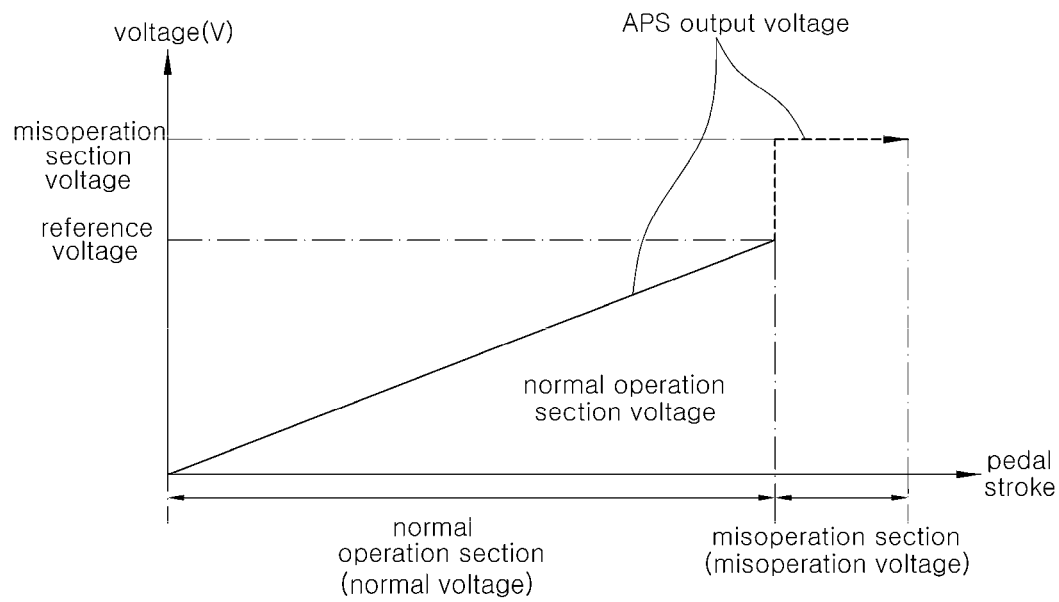

[Fig. 10]
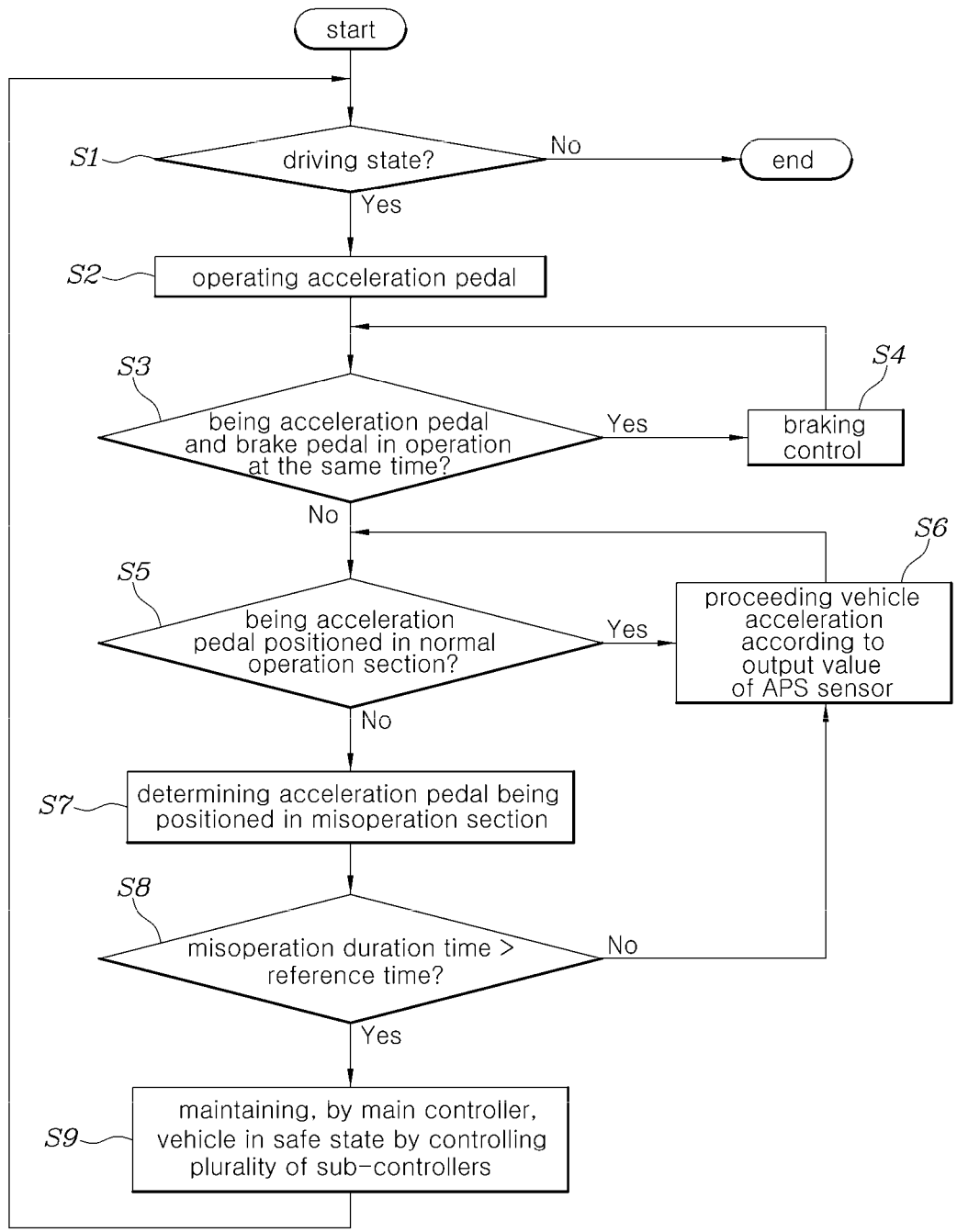

KICKDOWN SWITCH FOR ACCELERATION PEDAL AND METHOD OF CONTROLLING MISOPERATION OF ACCELERATION PEDAL USING THE SAME

CROSS REFERENCE TO RELATED APPLICATION

The present application claims the benefit of priority to Korean Patent Application No. 10-2019-0040805, filed on Apr. 8, 2019 in the Korean Intellectual Property Office, the entire contents of which are incorporated herein by reference.

TECHNICAL FIELD

The present disclosure relates to a kickdown switch for an accelerator pedal which informs definitely a driver of a misoperation state when the driver mistakes the accelerator pedal as a brake pedal, and further enhances safety of the vehicle through controlling the vehicle in the case of misoperation, and to a method of controlling misoperation of an accelerator pedal using the same.

BACKGROUND

A brake pedal is installed to be positioned on one side of an accelerator pedal since a clutch pedal is not present in an automatic transmission.

Accordingly, a case occurs often where, when performing sudden braking under an emergency situation, a novice driver, an elderly driver, or even an experienced driver operates an accelerator pedal and a brake pedal at the same time, or performs misoperation by mistaking an accelerator pedal as a brake pedal. As a result, instead of sudden braking, a vehicle accelerates rapidly, which causes personal injury and property damage due to accidents.

The foregoing is intended merely to aid in the understanding of the background of the present disclosure, and is not intended to mean that the present disclosure falls within the purview of the related art that is already known to those skilled in the art.

SUMMARY

An objective of the present disclosure is to provide a kickdown switch for an accelerator pedal which has an improved structure that informs more definitely a driver of a misoperation state when the driver misoperates the accelerator pedal instead of operating a brake pedal while braking is required. In addition, the driver definitely recognizes the misoperation state of the accelerator pedal through the kickdown switch with the improved structure. Accordingly, the driver stops operation of the accelerator pedal, and sudden acceleration of the vehicle and occurrence of accidents are prevented.

In addition, another objective of the present disclosure is to enhance vehicle safety by providing a control method of preventing sudden acceleration of the vehicle and occurrence of accidents by controlling the vehicle when misoperation of an accelerator pedal occurs.

In order to achieve the above objectives, according to one aspect of the present disclosure, a kickdown switch for an accelerator pedal may include: a friction surface through which a kickdown operation feeling is generated by being in contact with a lever that rotates when an accelerator pedal operates, wherein the friction surface includes: a first friction surface corresponding to a normal operation section of the accelerator pedal; and a second friction surface corresponding to a misoperation section of the accelerator pedal, wherein the first friction surface is a section where a pedal stepping force of the accelerator pedal is from zero to a reference pedal stepping force, and includes a kickdown feeling generation point, and the second friction surface is a section extending from the first friction surface and does not include the kickdown feeling generation point.

The first friction surface and the second friction surface may be configured to generate operation feelings different from each other by being in contact with the lever.

The first and second friction surfaces may be configured such that a first inclination angle between the first friction surface and a reference line extending in a load input direction when the accelerator pedal operates is smaller than a second inclination angle between the second friction surface and the reference line, and the pedal stepping force on the second friction surface is greater than the pedal stepping force on the first friction surface as the second inclination angle is greater than the first inclination angle.

The first friction surface may be formed in a flat surface, and the second friction surface may include a wave-shape where protrusions and grooves are continuously formed, such that the first friction surface and the second friction surface may generate operation feelings different from each other by being in contact with the lever.

The kickdown switch may further include: a box-shaped switch housing having a first side where the friction surface is arranged on an inner surface thereof, and having a second side including an opening exposed to an outside of the switch housing; a pushrod disposed in the opening and having a first end rotatably coupled in a hinged manner to the switch housing, such that a part of the pushrod is exposed to the outside of the switch housing through the opening, wherein the lever has a first end rotatably coupled in a hinged manner to a second end of the pushrod, extends in a load input direction from the accelerator pedal, and has a second end in contact with the friction surface, and a spring is disposed in a lengthwise direction of the pushrod and has a first end and a second end respectively coupled to the switch housing and the lever.

The accelerator pedal may include: a pedal housing fixedly installed in a vehicle body; and a rotation part that is a pedal arm or a pedal pad which rotates relative to the pedal housing by a driver's operation, wherein the switch housing is fixedly installed on the pedal housing, and the kickdown switch operates when the rotation part rotates and a part of the pushrod, which protrudes outwardly from the switch housing, is in contact with the rotation part.

The accelerator pedal may include: a pedal housing fixedly installed in a vehicle body; and a rotation part that is a pedal arm or a pedal pad which rotates relative to the pedal housing by a driver's operation, wherein the switch housing is fixedly installed on the rotation part, and the kickdown switch operates when the rotation part rotates and a part of the pushrod, which protrudes outwardly from the switch housing, is in contact with the pedal housing.

In addition, according to the present disclosure, a method of controlling misoperation of an accelerator pedal by using the kickdown switch includes steps of: determining whether a pedal stroke is in a normal operation section or in a misoperation section by using a signal output from an APS when an accelerator pedal operates while a vehicle is in a driving state; when the pedal stroke is determined to be in the misoperation section, determining whether or not a misoperation duration time has exceeded a set reference time; and when the misoperation duration time is determined to have exceeded the set reference time, maintaining, by a main controller, the vehicle in a safe state by controlling a plurality of sub-controllers.

The method may further include: before the step of determining whether a pedal stroke is in a normal operation section or in a misoperation section, determining whether or not the accelerator pedal and a brake pedal are in operation at the same time by using a signal of the APS and a signal of a brake switch when the accelerator pedal operates while the vehicle is in a driving state, wherein when the accelerator pedal is only in operation, the step of determining whether a pedal stroke is in a normal operation section or in a misoperation section is performed, and when the accelerator pedal and the brake pedal are in operation at the same time, braking control for the vehicle is performed by determining that misoperation of the accelerator pedal has occurred.

In the step of determining whether a pedal stroke is in a normal operation section or in a misoperation section, when a voltage of a signal output from the APS when the accelerator pedal operates is equal to or smaller than a reference voltage, the pedal stroke may be determined to be in the normal operation section, and when the voltage of the signal exceeds the reference voltage, the pedal stroke may be determined to be in the misoperation section.

When the pedal stroke is determined to be in the normal operation section, vehicle acceleration may be controlled to be proceeded normally under a condition corresponding to an output signal value of the APS.

When the misoperation duration time is determined to be equal to or smaller than the reference time, vehicle acceleration may be controlled to be proceeded normally under a condition corresponding to an output signal value of the APS.

The plurality of sub-controllers may include: a cluster transmitting warning messages; an engine controller (ECU) controlling an engine rpm; a transmission controller (TCU) controlling a gear shift; and a braking controller (ECS) for braking control, and when it is determined that the misoperation duration time exceeds the reference time, the main controller controls the plurality of sub-controllers at the same time so that the vehicle is shut down.

The present disclosure provides a kickdown switch for an accelerator pedal which has an improved structure that informs definitely a driver of a misoperation state when the driver miss operates the accelerator pedal rather than operating a brake pedal while braking is required. In addition, the driver can definitely recognize the misoperation state of the accelerator pedal through the kickdown switch with the improved structure. Accordingly, the driver can rapidly stop misoperation of the accelerator pedal and sudden acceleration of the vehicle, whereby occurrence of accidents can be prevented.

In addition, the present disclosure can prevent sudden acceleration of the vehicle and occurrence of accidents by safely controlling the vehicle when misoperation of an accelerator pedal occurs.

BRIEF DESCRIPTION OF THE DRAWINGS

The above and other objects, features and other advantages of the present disclosure will be more clearly understood from the following detailed description when taken in conjunction with the accompanying drawings, in which:

FIGS. 1 and 2 are side views of an accelerator pedal where a kickdown switch according to an exemplary embodiment of the present disclosure is provided in a pedal housing and in a rotation part, respectively;

FIG. 3 is a view showing a kickdown switch according to an exemplary embodiment of the present disclosure where a lever is in contact with a first friction surface before operating the kickdown switch;

FIG. 4 is a view showing where the lever is in contact with a second friction surface after operating the kickdown switch in FIG. 3;

FIG. 5 is a graph showing a pedal stepping force as a function of a pedal stroke for the kickdown switch according to the exemplary embodiment of FIGS. 3 and 4;

FIG. 6 is a view showing a kickdown switch according to another exemplary embodiment of the present disclosure where a second friction surface is formed with a waveshape;

FIG. 7 is a graph showing a pedal stepping force as a function of a pedal stroke for the kickdown switch according to the exemplary embodiment of FIG. 6; and FIGS. 8 to 10 are a block diagram, a graph, and a flowchart used for explaining a method of controlling misoperation of an accelerator pedal by using a kickdown switch according to the present disclosure, respectively, in which the graph shows output voltage of an APS as a function of pedal stroke.

DETAILED DESCRIPTION

Hereinafter, a kickdown switch for an accelerator pedal and a method of controlling misoperation of an accelerator pedal by using the kickdown switch according to a preferred embodiment of the present disclosure will be described with reference to the accompanying drawings.

A controller (control unit) according to an exemplary embodiment of the present disclosure may be employed by using a non-volatile memory (not shown) that is configured to store algorithm configured to control operations of various configuration elements of a vehicle or data related to software instructions executing the algorithm, and by using a processor (not shown) configured to execute operations that will be described in below by using data stored in the corresponding memory. Herein, the memory and the processor may be employed in a separate chip. Alternatively, the memory and the processor may be employed in a single chip by integrating the same. The processor may take the form of one or more processors.

An exemplary embodiment of the present disclosure provides a configuration that informs a driver of misoperation of an accelerator pedal by using a kickdown switch provided in the accelerator pedal when the driver misoperates the accelerator pedal rather a brake pedal while braking is required.

Accelerator pedals of vehicles include a pendant type installed by being suspended in a dash panel and an organ type installed on a floor panel according to an installation structure.

In case of a pendant-type accelerator pedal, a pedal housing is fixedly installed on a dash panel constituting a vehicle body, and in case of an organ type accelerator pedal, a pedal housing is fixedly installed on a floor panel constituting a vehicle body.

An exemplary embodiment of the present disclosure will be described by using an organ type accelerator pedal.

In case of an organ type accelerator pedal, a pedal housing 1 is fixedly installed on a floor panel constituting a vehicle body, and a rotation part 2 that rotates relative to the pedal housing 1 by the driver's operation is coupled to the pedal housing 1.

In case of a pendant type accelerator pedal, a rotation part becomes a pedal arm, and in case of an organ type accelerator pedal, a rotation part 2 becomes a pedal pad.

A kickdown switch 3 according to the present disclosure may be fixedly installed on the pedal housing 1 as shown FIG. 1. Herein, the kickdown switch 3 operates by being in contact with the rotation part 2 when a driver steps on and operates the rotation part 2.

In another example, the kickdown switch 3 may be fixedly installed on the rotation part 2 as shown FIG. 2. Herein, the kickdown switch 3 operates by being in contact with the pedal housing 1 when the driver steps on and operates the rotation part 2.

An exemplary embodiment of the present disclosure will be described by using a configuration where the kickdown switch 3 is installed on the pedal housing 1 as a basic configuration.

The kickdown switch 3 includes a switch housing 100, a pushrod 200, a lever 300, and a spring 400.

The switch housing 100 is formed in a box shape with an empty space 110 therein, formed with a friction surface 120 in an inner surface at a first side thereof, and formed with an opening 130 at a second side thereof for exposure to the outside.

The pushrod 200 is positioned at the opening 130 of the switch housing 100, rotatably coupled to the switch housing 100 via a rotation shaft 210 at a first end thereof, formed with a hinge protrusion 220 at a second end thereof, and formed with a protrusion part 230 between the first and second ends which outwardly protrudes from the switch housing 100 through the opening 130.

The protrusion part 230 of the pushrod 200 becomes a part that is in contact with the rotation part 2.

The lever 300 is formed with a ring-shaped lever groove 310 at a first end thereof so as to be rotatably coupled to the hinge protrusion 220 of the pushrod 200, and is formed to extend toward the friction surface 120 in a load input direction F1 at a second end thereof.

The lever 300 is formed with a lever protrusion 320 outwardly protruding at a second end thereof, and the lever protrusion 320 is installed to be in contact with the friction surface 120 of the switch housing 100.

The spring 400 is a compression coil spring, disposed to extend in a lengthwise direction of the pushrod 200, and installed such that both ends thereof are inserted into spring protrusions 140 and 330 formed in the switch housing 100 and the lever 300, respectively.

The spring 400 accumulates elastic force by being compressed when the lever 300 rotates from an initial state of FIG. 3 as the driver steps on and operates the rotation part 2 as shown in FIG. 4, and functions to return the lever 300 and the pushrod 200 to an initial position as in FIG. 3 which are rotated by elastic force as the shape of the spring 400 is restored when the driver removes force applied to the rotation part 2.

The friction surface 120 of the switch housing 100 is a surface where the lever protrusion 320 of the lever 300 that rotates when the accelerator pedal operates is in contact with the same, and functions to generate a kickdown operation feeling by being in contact with the lever 300.

The friction surface 120 according to the present disclosure is formed with a first friction surface 121 corresponding to a normal operation section of the accelerator pedal, and a second friction surface 122 continuously extending from the first friction surface 121 which corresponds to a misoperation section.

The first friction surface 121 may be defined as a section where a pedal stepping force of the accelerator pedal is from zero to a reference pedal stepping force, and including a kickdown operation feeling generation point.

A point where the pedal stepping force of the accelerator pedal is zero is a situation where the driver does not operate the rotation part 2 of the accelerator pedal. Herein, the kickdown switch 3 maintains the state of FIG. 3, and the lever protrusion 320 of the lever 300 is positioned at a starting point of the first friction surface 121.

The reference pedal stepping force is a section where the rotation part 2 rotates for normal acceleration of the vehicle, a section from approximately 0 to 80% based on a pedal stroke, and a section from approximately 0 to 20 kgf based on the pedal stepping force.

In a section of the first friction surface 121 corresponding to a normal operation section, a kickdown operation feeling generation point is included.

That is, the lever protrusion 320 of the lever 300 moves from the starting point of the first friction surface 121 to an end point of the first friction surface 121, and a concave groove 121a is formed at a position close to the end point of the first friction surface 121. Accordingly, a position where the concave groove 121a is formed may be defined as a kickdown operation feeling generation point.

When the lever protrusion 320 arrives on the concave groove 121a and is inserted thereto, the driver may recognize that the kickdown operation feeling generation point has arrived by receiving a shift feeling.

In addition, the second friction surface 122 is a section that is continuously formed to extend from the first friction surface 121 and does not include a kickdown operation feeling generation point, and may be defined as a section after the reference pedal stepping force.

When braking is required in an emergency situation, the driver steps on the brake pedal with great force to perform sudden braking.

However, when the driver accidentally steps on the accelerator pedal with great force by mistaking the accelerator pedal as a brake pedal where sudden braking is required, the risk of accidents due to rapid acceleration is increased. Herein, the pushrod 200 and the lever 300 over rotate as shown FIG. 4, and the lever protrusion 320 passes through the first friction surface 121 corresponding to a normal operation section, and comes in contact with the second friction surface 122 corresponding to a misoperation section as the lever 300 over rotates.

As described above, when a situation occurs where the lever protrusion 320 is in contact with the second friction surface 122 corresponding to a misoperation section as miss operation of the accelerator pedal occurs where braking is required, according to an exemplary embodiment of the present disclosure, a feeling informing of a misoperation section can be transmitted to the driver, and thus the driver is informed of the misoperation thereby reducing the risk of accidents.

The second friction surface 122 corresponding to a misoperation section is a section approximately after 80% based on a pedal stroke, and a section approximately after 20 kgf based on a pedal stepping force.

When a situation occurs where the lever 300 is in contact with the second friction surface 122 corresponding to a misoperation section as misoperation of the accelerator pedal occurs, a configuration is employed where operation feelings of the lever 300 which are different from each other are generated when the lever 300 is in the first friction surface 121 and in the second friction surface 122 so as to inform the driver of the above situation.

As an example, as shown in FIGS. 3 and 4, a second inclination angle A2 formed between a reference line L1 extending in a load input direction F1 when the accelerator pedal operates and the second friction surface 122 is formed to be greater than a first inclination angle A1 formed between the reference line L1 and the first friction surface 121. When the second inclination angle A2 is formed to be greater than the first inclination angle A1 as above, friction with the lever 300 becomes greater when being in contact with the second friction surface 122 than being in contact with the first friction surface 121. Thus, a pedal stepping force on the second friction surface 122 becomes greater than a pedal stepping force on the first friction surface 121. Accordingly, the driver can easily recognize the misoperation by being provided with the pedal stepping force that is rapidly increased in the second friction surface 122.

In FIG. 5, the above situation is shown in a graph.

FIG. 5 is a graph showing an accelerator pedal stepping force as a function of a pedal stroke used for explaining the operation of the kickdown switch. When the lever 300 rotating by operating the accelerator pedal passes the first friction surface 121 where the first inclination angle A1 is formed, the pedal stepping force is gradually increased, and when the lever 300 comes in contact with the second friction surface 122 where the second inclination angle A2 having a large inclination angle by passing through the first friction surface 121 is formed, the pedal stepping force is rapidly increased due to the second inclination angle A2 forming a sharp angle. Accordingly, the driver can easily recognize the misoperation due to the pedal stepping force that has been rapidly increased.

As another example, as shown in FIG. 6, a first friction surface 121 may be formed in a flat surface and a second friction surface 122 may have a wave-shape 122a where protrusions and grooves are continuously formed. Accordingly, a configuration may be employed where operation feelings are different from each other when the lever 300 is in contact with the first friction surface 121 and with the second friction surface 122.

In other words, when the lever 300 rotating by operating the accelerator pedal passes the first friction surface 121 formed with a first inclination angle A1 having a gradual angle, the pedal stepping force is gradually increased as shown in a graph of FIG. 7, and when the lever 300 passes through the first friction surface 121 and comes in contact with the second friction surface 122 having the wave-shape 122a, the pedal stepping force is repeatedly increased and decreased in a short time. Accordingly, the driver can easily recognize the misoperation by receiving a rattling feeling where the pedal stepping force is repeatedly increased and decreased.

In addition, the present disclosure provides logic for preventing accidents by performing vehicle control when a situation occurs where misoperation of the accelerator pedal occurs as above. A method of controlling misoperation of an accelerator pedal by using a kickdown switch will be described with reference to FIGS. 8 to 10.

A main controller 10 is configured to receive a signal (output voltage signal) whether or not a brake pedal 21 operates through a brake switch 22 when the brake pedal 21 operates. In addition, the main controller 10 is configured to receive a signal (output voltage signal) whether or not an accelerator pedal 31 operates through an APS 32 (accelerator position sensor) when the accelerator pedal 31 operates.

Subsequently, when the accelerator pedal 31 operates, the driver receives a feeling of misoperation of the accelerator pedal by operation of the kickdown switch 3. Accordingly, the driver receives a feeling that the pedal stepping force is rapidly increased in the second friction surface 122 or a feeling that the pedal stepping force changes according to the wave-shape 122a.

The main controller 10 maintains the vehicle in a safe state by controlling a plurality of sub-controllers 50 provided in the vehicle by using a signal of the brake switch 22 and a signal of the APS 32.

The sub-controllers 50 include a cluster 51 transmitting warning messages, an engine controller 52 (ECU) controlling an engine rpm, and a transmission controller 53 (TCU) controlling a gear shift, and a braking controller 54 (ECS) for braking control.

Referring to FIG. 10, under a state where the vehicle drives in S1, the accelerator pedal 31 is operated in S2, and the main controller 10 determines whether or not the accelerator pedal 31 and the brake pedal 21 are in operation at the same time by using a signal of the brake switch 22 and a signal of the APS 32 in S3.

When the accelerator pedal 31 and the brake pedal 21 are in operation at the same time in S3, the main controller 10 determines that misoperation of the accelerator pedal has occurred, and controls braking operation to have priority. For the same, the main controller 10 performs braking by controlling the braking controller 54 in S4.

However, when the accelerator pedal is only in operation in S3, as a subsequent step, whether a stroke of the accelerator pedal is in a normal operation section or in a misoperation section is determined in S5.

A pedal stepping force generated when the lever 300 rotating by operating the accelerator pedal passes and is in contact with the second friction surface 122 is much larger than a pedal stepping force generated when the lever 300 passes the first friction surface 121. Accordingly, a voltage V output from the APS 32 is largely increased when the lever 300 passes the second friction surface 122 than when the lever 300 passes the first friction surface 121.

Accordingly, the main controller 10 determines that the pedal stroke is in a normal operation section when an output voltage of a signal output through the APS 32 which is output when the accelerator pedal operates is equal to or smaller than a reference voltage, and determines that the pedal stroke is in a misoperation section when the voltage of the signal exceeds the reference voltage.

When the pedal stroke is in a normal operation section in S5, in S6, the vehicle is controlled such that vehicle acceleration is proceeded normally under a condition corresponding to an output signal value of the APS 32. When the pedal stroke is in a misoperation section in S7, in S8, whether or not a misoperation duration time exceeds a reference time is determined.

When the misoperation duration time is equal to or smaller than the reference time in S8, it may be determined as a situation where the driver has recognized the misoperation situation by receiving a feeling through the mechanical structure of the kickdown switch 3, and has lift his or her foot off the accelerator pedal. Herein, in S6, the main controller 10 controls vehicle acceleration to be proceeded normally under a condition corresponding to an output signal value of the APS.

However, when the misoperation duration time exceeds the reference time in S8, in S9, the main controller 10 controls the vehicle to maintain a safe state by controlling the plurality of sub-controllers 50.

In other words, the plurality of sub-controllers include a cluster 51 transmitting warning messages, an engine controller (ECU) controlling an engine rpm, a transmission controller 53 (TCU) controlling a gear shift, and a braking controller 54 (ESC) for braking control, and when it is determined that the misoperation duration time exceeds the reference time, the main controller 10 controls such that the vehicle is shut down by controlling all of the plurality of sub-controls 50 at the same time.

As described above, according to exemplary embodiments of the present disclosure, the driver can be informed more definitely of a misoperation state by using a kickdown switch 3 with an improved structure when braking is required but the driver mistakes the accelerator pedal as a brake pedal. Accordingly, the driver can rapidly stop misoperation of the accelerator pedal and sudden acceleration of the vehicle, whereby occurrence of accidents can be prevented.

In addition, according to exemplary embodiments of the present disclosure, sudden acceleration of the vehicle and occurrence of accidents can be prevented by safely controlling the vehicle when misoperation of an accelerator pedal occurs.

Although exemplary embodiments of the present disclosure have been disclosed for illustrative purposes, those skilled in the art will appreciate that various modifications, additions and substitutions are possible, without departing from the scope and spirit of the disclosure as set forth in the accompanying claims.

What is claimed is:

1. A kickdown switch for an accelerator pedal, the kickdown switch comprising:
    a friction surface through which a kickdown operation feeling is generated by being in contact with a lever that rotates when an accelerator pedal operates,
    wherein the friction surface includes: a first friction surface corresponding to a normal operation section of the accelerator pedal; and a second friction surface corresponding to a misoperation section of the accelerator pedal,
    wherein the first friction surface is a section where a pedal stepping force of the accelerator pedal is from zero to a reference pedal stepping force and includes a kickdown feeling generation point, and the second friction surface is a section extending from the first friction surface and does not include the kickdown feeling generation point.

2. The kickdown switch of claim 1, wherein the first friction surface and the second friction surface are configured to generate operation feelings different from each other by being in contact with the lever.

3. The kickdown switch of claim 1, wherein the first and second friction surfaces are configured such that a first inclination angle between the first friction surface and a reference line extending in a load input direction when the accelerator pedal operates is smaller than a second inclination angle between the second friction surface and the reference line, and
    the pedal stepping force on the second friction surface is greater than the pedal stepping force on the first friction surface as the second inclination angle is greater than the first inclination angle.

4. The kickdown switch of claim 1, wherein the first friction surface includes a flat surface, and the second friction surface includes a wave-shape where protrusions and grooves are continuously formed, such that the first friction surface and the second friction surface generate operation feelings different from each other by being in contact with the lever.

5. The kickdown switch of claim 1, further comprising:
    a box-shaped switch housing having a first side where the friction surface is arranged on an inner surface thereof, and having a second side including an opening exposed to an outside of the switch housing; and
    a pushrod disposed in the opening and having a first end rotatably coupled in a hinged manner to the switch housing, such that a part of the pushrod is exposed to the outside of the switch housing through the opening,
    wherein the lever has a first end rotatably coupled in a hinged manner to a second end of the pushrod, extends in a load input direction from the accelerator pedal, and has a second end in contact with the friction surface, and
    wherein a spring is disposed in a lengthwise direction of the pushrod and has a first end and a second end respectively coupled to the switch housing and the lever.

6. The kickdown switch of claim 5, wherein the accelerator pedal includes: a pedal housing fixedly installed in a vehicle body; and a rotation part that is a pedal arm or a pedal pad which rotates relative to the pedal housing by a driver's operation,
    wherein the switch housing is fixedly installed on the pedal housing, and
    wherein the kickdown switch operates when the rotation part rotates and a part of the pushrod, which protrudes outwardly from the switch housing, is in contact with the rotation part.

7. The kickdown switch of claim 5, wherein the accelerator pedal includes: a pedal housing fixedly installed in a vehicle body; and a rotation part that is a pedal arm or a pedal pad which rotates relative to the pedal housing by a driver's operation,
    wherein the switch housing is fixedly installed on the rotation part, and
    wherein the kickdown switch operates when the rotation part rotates and a part of the pushrod, which protrudes outwardly from the switch housing, is in contact with the pedal housing.

8. A method of controlling misoperation of an accelerator pedal by using a kickdown switch, wherein the method controls misoperation of an accelerator pedal by using the kickdown switch of claim 1, the method comprising steps of:
    determining whether a pedal stroke is in a normal operation section or in a misoperation section by using a signal output from an APS when an accelerator pedal operates while a vehicle is in a driving state;
    when the pedal stroke is determined to be in the misoperation section, determining whether or not a misoperation duration time has exceeded a set reference time; and
    when the misoperation duration time is determined to have exceeded the set reference time, maintaining, by a main controller, the vehicle in a safe state by controlling a plurality of sub-controllers.

9. The method of claim 8, further comprising: before the step of determining whether a pedal stroke is in a normal operation section or in a misoperation section, determining whether or not the accelerator pedal and a brake pedal are in operation at the same time by using a signal of the APS and a signal of a brake switch when the accelerator pedal operates while the vehicle is in a driving state, wherein when the accelerator pedal is only in operation, the step of determining whether a pedal stroke is in a normal operation section or in a misoperation section is performed, and when the accelerator pedal and the brake pedal are in operation at the same time, braking control for the vehicle is performed by determining that misoperation of the accelerator pedal has occurred.

10. The method of claim 8, wherein in the step of determining whether a pedal stroke is in a normal operation section or in a misoperation section, when a voltage of a signal output from the APS when the accelerator pedal operates is equal to or smaller than a reference voltage, the pedal stroke is determined to be in the normal operation section, and when the voltage of the signal exceeds the reference voltage, the pedal stroke is determined to be in the misoperation section.

11. The method of claim 8, wherein when the pedal stroke is determined to be in the normal operation section, vehicle acceleration is controlled to be proceeded normally under a condition corresponding to an output signal value of the APS.

12. The method of claim 8, wherein when the misoperation duration time is determined to be equal to or smaller than the reference time, vehicle acceleration is controlled to be proceeded normally under a condition corresponding to an output signal value of the APS.

13. The method of claim 8, wherein the plurality of sub-controllers include: a cluster transmitting warning messages; an engine controller (ECU) controlling an engine rpm; a transmission controller (TCU) controlling a gear shift; and a braking controller (ECS) for braking control, and when it is determined that the misoperation duration time exceeds the reference time, the main controller controls the plurality of sub-controllers at the same time so that the vehicle is shut down.

* * * * *